United States Patent [19]

De Busscher et al.

[11] Patent Number: 4,956,967
[45] Date of Patent: Sep. 18, 1990

[54] AGRICULTURAL BALER WITH FEEDER DOOR

[75] Inventors: Cyriel R. J. De Busscher, Damme; Cornelis G. M. Muijs, Merelbeke; Gery G. R. Verweirder, Zedelgem, all of Belgium

[73] Assignee: Ford New Holland, Inc., New Holland, Pa.

[21] Appl. No.: 343,457

[22] Filed: Apr. 25, 1989

[30] Foreign Application Priority Data

Apr. 28, 1988 [GB] United Kingdom ............... 8810064

[51] Int. Cl.⁵ ........................................... A01D 39/00
[52] U.S. Cl. ..................................... 56/341; 100/142; 100/189
[58] Field of Search ............... 100/189, 142, 7, 45, 100/179, 188 R, 190; 56/341, 344; 292/221, 223

[56] References Cited

U.S. PATENT DOCUMENTS

| | | | |
|---|---|---|---|
| 2,552,888 | 5/1951 | Druetta | 100/189 |
| 4,407,190 | 10/1983 | Cheatum | 292/221 X |
| 4,768,525 | 9/1988 | Tanis | 56/10.2 X |

FOREIGN PATENT DOCUMENTS

| | | |
|---|---|---|
| 074533 | 3/1983 | European Pat. Off. . |
| 1163072 | 2/1964 | Fed. Rep. of Germany ........ 56/344 |
| 3625639 | 2/1988 | Fed. Rep. of Germany ...... 100/189 |
| 1069699 | 10/1952 | France . |
| 7807102 | 1/1980 | Netherlands . |
| 1577168 | 10/1980 | United Kingdom . |
| 2059869 | 6/1983 | United Kingdom . |

Primary Examiner—Philip R. Coe
Assistant Examiner—Stephen F. Gerrity
Attorney, Agent, or Firm—Darrell F. Marquette; Frank A. Seemar; Larry W. Miller

[57] ABSTRACT

An agricultural baler operable to produce square bales comprises a bale case having an inlet opening formed therein, a feeder duct communicating at one end with the inlet opening in the bale case, and feeder tines operable to feed crop material into the feeder duct to form a wad of crop material for subsequent transfer to the bale case. The feeder duct is provided with an opening in a wall thereof, and releasable doors are provided for the opening in the wall of the feeder duct. Thus, in the event of the feeder duct becoming plugged, all that is necessary to remove the plug of crop material is for the doors for the opening in the wall of the feeder duct to be released and for the feeder tines to be driven so that the plug of crop material is dislodged and discharged through the opening in the feeder duct wall.

6 Claims, 3 Drawing Sheets

AGRICULTURAL BALER WITH FEEDER DOOR

BACKGROUND OF THE INVENTION

This invention relates to agricultural balers for producing the so-called square or rectangular type of bale, as opposed to the cylindrical or round bale. More specifically, the invention relates to such balers which produce relatively large square bales and are constructed differently from the balers producing smaller square bales.

The principle difference between the small and large square balers is that in the former, the bale case in which a bale is actually formed has wads of crop material delivered to it from a feeder duct positioned to one side of the bale case, whereas in the latter, the feeder duct is located beneath the bale case, whereby the latter is bottom fed. Furthermore, the cross-sectional area of the bale case of the large baler is considerably greater than that for the small baler, whereby the wad of crop material periodically fed to the bale case is correspondingly larger. It is desirable to provide a relatively compact wad of crop material in the feeder duct in order to ensure a relatively constant density of the bale being formed but in the case of a large baler with the greater amount of crop material involved, this can give rise to plugging of the feeder duct when, for example, normally dry crop is damp when being baled, or naturally moist crop, such as silage, is being baled. Traditionally, silage has been stored in silos but this requires the use of a forage harvester in order to pick up crop material and chop it into small pieces. Normally a trailer moves alongside the forage harvester and into which crop material is blown by the machine. The trailer then transports the crop material from the field to the place of storage. If a tower silo is employed, then a blower is required to transfer the silage from the trailer to the tower. Farmers are looking increasingly to the use of a baler for operating on silage because the machine is normally available to him as it is required to bale other crops and the handling and storage of bales of crop material is that much more convenient. On the other hand if any specialised equipment is required in this respect, then again it is normally available to the farmer as he will be using it to handle bales of other crop material.

The use of a baler for baling silage means that there is an increased risk of the feeder duct to the bale case becoming plugged. The general problem of plugging has been addressed in the past and steps taken to reduce the likelihood thereof, such as by the use of expandable feeder ducts as disclosed in U.S. Pat. No. 2,552,888; British Patent No. 2,059,869 and Dutch Patent No. 7807102, for example. However, these measures cannot be guaranteed to prevent plugging of the bale case feeder duct and when plugging occurs, it is extremely difficult, and hence time consuming, to remove the plug of crop material. This is because ready access to the feeder duct cannot be gained (even if the pick-up device is removed) and even if it could, it is not an easy task manually to pull the plug of crop material from the feeder duct because the plug is very tightly wedged in the duct and the crop feeder mechanism present in the duct aggravates the problem. Indeed, the plug is so often tightly wedged that even the feeder mechanism operable to feed crop material into the feeder duct cannot be reversed in order to help remove the plug of crop material.

SUMMARY OF THE INVENTION

Accordingly, it is an object of the present invention to provide a square baler which is quickly freed of any plug of crop material in the bale case feeder duct.

According to the present invention there is provided an agricultural baler including a bale case having an inlet opening formed therein, a feeder duct communicating at one end with the inlet opening in the bale case, and feeder means operable to feed crop material into the feeder duct to form a wad of crop material for subsequent transfer to the bale case. An improvement comprises the feeder duct being provided with an opening in a wall thereof, and releasable closure means for the opening in the wall of the feeder duct.

Thus, in the event of the feeder duct becoming plugged, all that is necessary to remove the plug of crop material is for the closure means for the opening in the wall of the feeder duct to be released and eventually for the feeder means to be driven so that the plug of crop material is dislodged and discharged through the opening in the feeder duct wall. This operation normally only takes minutes to accomplish, compared with hours for removing a plug of crop material manually.

The closure means may be in the form of a door attached by a hinge at one edge of the opening in the feeder duct and provided with releasable latch means. Preferably, the closure means is in the form of a pair of doors hingedly attached to respective opposed edges of the opening in the feeder duct. The use of a pair of doors means that each door will be smaller than if a single door were employed so that a greater opening movement of the doors is likely to be achieved, having regard to the fact that adjacent parts of the machine, such as a wheel axle, for example, may limit the extent of opening of a door. Also, the smaller doors will achieve a greater ground clearance when hanging substantially vertically, this being advantageous when the machine is moved from over a discharged plug of crop material, which maneuver usually has to be conducted with the doors open because the plug of crop material prevents closure of one or both doors.

The doors of the pair may be of differing lengths and may be arranged to overlap at their adjacent edges, with the leading door, as seen relative to the direction of flow of crop material through the feeder duct, overlying the trailing door in order to provide a smooth flow of crop material over the junction of the two doors. In order to assist further in this respect, the edge of the trailing door which cooperates with the adjacent edge of the leading door is stepped in order to receive the latter and thus maintain the bodies of the doors in a single plane. This plane may be curved and preferably, the opening in the feeder duct is positioned at a bend in the bottom wall of that duct which may curve through approximately 90° in extending from an inlet end to receive crop material to an outlet end which is connected to the inlet in the bale case. Thus the feeder duct crop inlet is generally vertical and the outlet generally horizontal.

The pair of doors may be provided with common latch means which may be in the form of a latch plate which is pivotally mounted and provided with a slot for receiving a pin attached to one of the doors. Preferably, a latch plate and associated latch pin is provided at each side of the door or doors. In as much as the loading force on the doors in the opening direction thereof caused by a plug of crop material in the feeder duct is very high, then it is desirable not to have to overcome this force in opening the latch means. Accordingly, the latch plate is preferably arranged such that it pivots in a direction generally at right angles to the force applied to the doors and this pivotal movement may be effected manually or by some other means. In one embodiment, the latch plate at each side of the doors is operated by a lever or handle via a mechanical linkage, the lever being attached to a shaft which extends across the width of the doors. First links of two linkage mechanisms for the respective latch plates are each fixedly attached at one end to the shaft and have pivotally connected to its other end one end of a second link which is in turn pivotally attached at its other end to the associated latch plate. Accordingly, operation of the lever at one side of the machine will release both latches. The latch plates may be spring loaded so that they return to the latching position once the actuating lever has been released, whereby the pins on the one door will snap into the respective slots of the latch plates when closed.

The hinge pin of the door may be in the form of a shaft to which a handle is attached, these handles being used to close the doors once they have swung to the open position on release of the latch means. Thus in order to effect closure in the two-door embodiment, it is merely necessary first to operate the handle associated with the leading door so as to close the same and then operate the handle associated with the trailing door until the latch pins on the latter snap into the slots in the latch plates. The closure of the doors is readily effected by a single operator in standing position from the side of the baler.

DESCRIPTION OF THE DRAWINGS

An agricultural baler in accordance with the present invention will now be described in greater detail, by way of example, with reference to the accompanying drawings, in which.

DESCRIPTION OF THE PREFERRED EMBODIMENT

In the following description, right hand and left hand references are determined by standing at the rear of the machine and facing in a direction of forward travel. It is to be understood that such terms as "forward", "rearward", "left", "right", "upwardly", etc. are words of convenience and are not to be construed as limiting terms.

Figure 1:
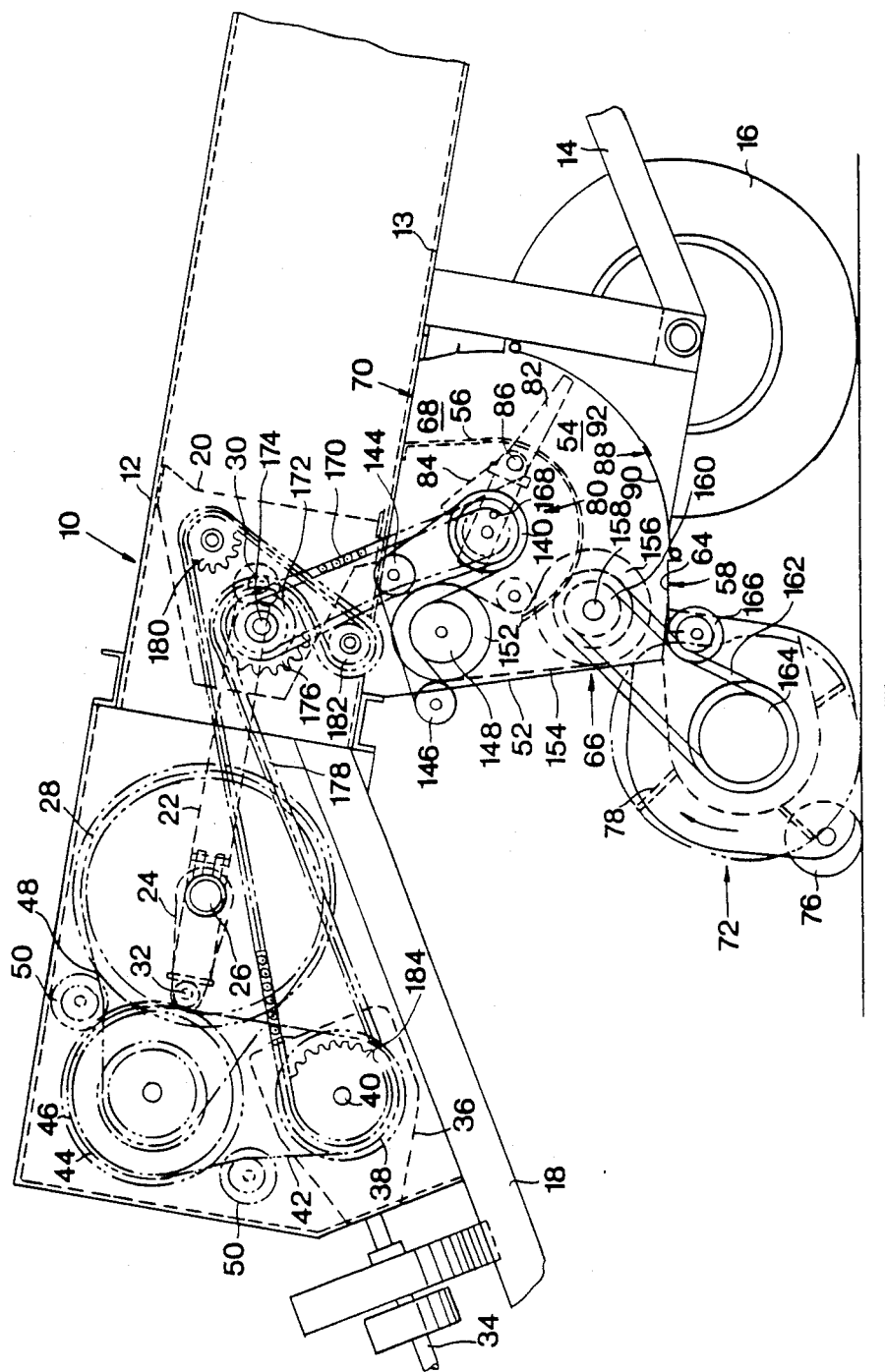
FIG. 1 is a diagrammatic side view of the baler.

Referring to FIG. 1, a baler 10 includes a bale case 12 mounted on a frame 14 which is supported by wheels 16. A tongue 18 extends forwardly from the bale case 12 for attachment to a tractor (not shown). A plunger 20 is reciprocally disposed in the bale case 12 to form crop material into rectangular bales. The plunger 20 is attached by a connecting rod 22 to a crank arm 24 fixed to a shaft 26 on which a sprocket 28 is fixedly mounted. The connecting rod 22 has a pivotal connection 30 at one end with the plunger 20 and another pivotal connection 32 at the other end with the crank arm 24.

A drive shaft 34 is connected at one end to a gearbox 36 carried on the baler 10 and is adapted for connection at the other end to the PTO of a tractor (not shown). The drive shaft 34 causes clockwise rotation, as viewed in FIG. 1, of a sprocket 38 which is fixed to the output shaft 40 of the gearbox 36. The sprocket 38 is connected via a chain 42 to a sprocket 44 of larger diameter. A sprocket 46 is fixed to rotate with the sprocket 44. This arrangement of sprockets provides a speed reduction from the sprocket 38 to the sprocket 46. A chain 48 connects the sprocket 46 to the sprocket 28 to cause clockwise rotation of the sprocket 28, as viewed in FIG. 1, in order to cause reciprocation of the plunger 20 in a fore-and-aft direction in the bale case 12. Idlers 50 are provided to maintain proper tension in the chains 42 and 48.

A feed chamber 52 is mounted underneath the bale case 12 and includes a curved duct 54 having top and bottom walls 56 and 58, respectively, and side walls. The top wall 56 is formed of a series of generally U-shaped members which are so arranged side-by-side that slots are provided between adjacent members. The bottom wall 58 is formed primarily of a single curved, continuous panel member 64 save for doors to be referred. The curved duct 54 extends through approximately 90° and is open at its lower end 66 and at its upper end 68, the upper end communicating with an inlet opening 70 formed in the bottom wall 13 of the bale case 12. A crop pick-up device 72 of a conventional type is pivotally connected at 158 to the feed chamber 52 and is supported by ground wheels 76. The pick-up device 72 includes a plurality of fingers 78 which are rotatable in the direction indicated in FIG. 1 for lifting crop material from the ground and delivering it towards the feed chamber 52.

A feeder mechanism 80 is provided in the feed chamber 52 for moving crop material towards the lower end 66 of the duct 54, then through the duct 54 from its lower end 66 to its upper end 68, and then into the bale case 12 through the inlet opening 70 in the bottom wall 13 thereof. Augers, not shown, are operable to move crop material from the outer regions of the feed chamber 52 inwardly towards the lower and inlet end 66 of the feeder duct 54.

Figure 2:
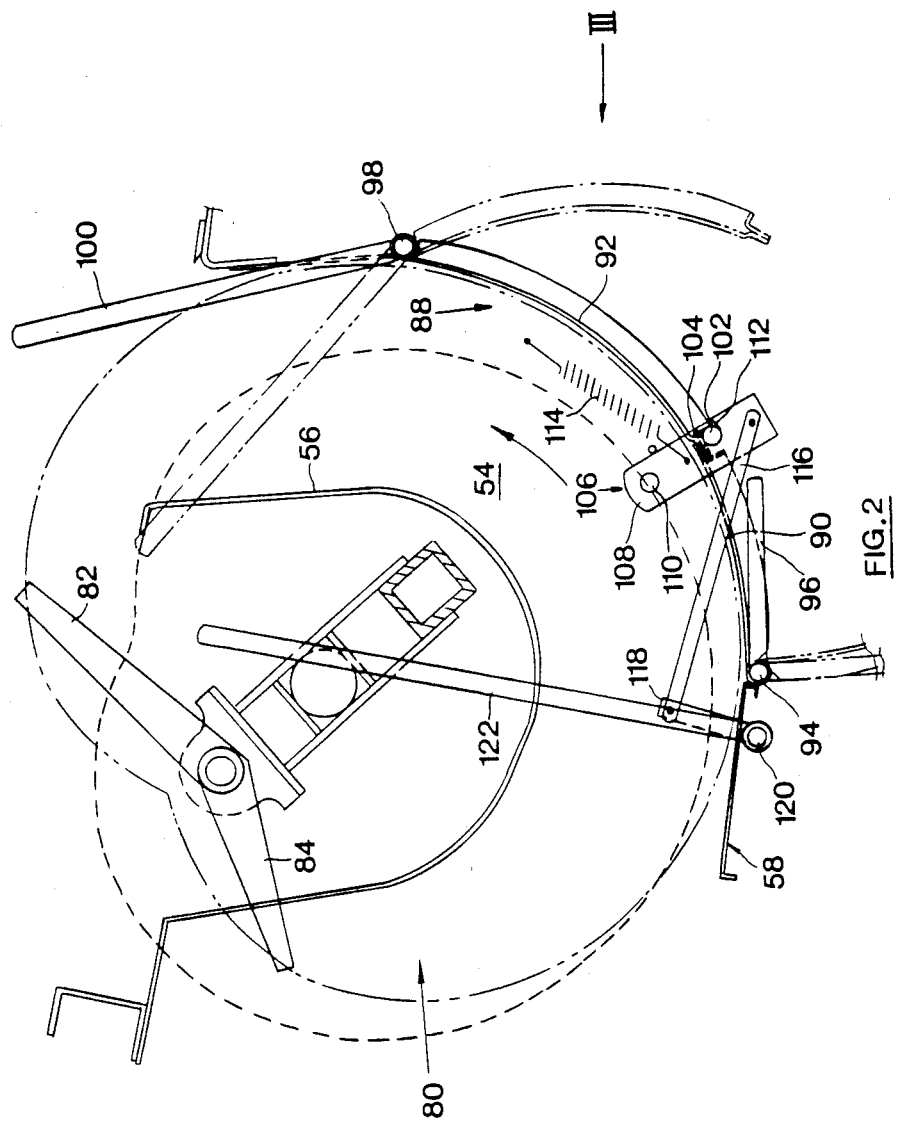
FIG. 2 is an enlarged view of a portion of FIG. 1, with certain parts removed.

The feeder mechanism 80 also includes two sets of feeder elements or tines 82, 84 fixed to a shaft 86, as best seen in FIG. 2, with the tines 82, 84 arranged to project through the slots in the top wall 56 of the ductd 54. The tines 82 are longer than the tines 84. Only the tines 82, and not the tines 84, will pass through slots formed in the bale plunger 20 and through slots formed in the bottom wall 13 of the bale case 12.

The baler thus far described is of known form and is disclosed in U.S. Pat. No. 4,525,991 granted July 2, 1985, to A. Naaktgeboren which disclosure is hereby incorporated by reference and which will provide details of the machine which are not directly associated with the present invention.

As is best seen in FIG. 2 of the drawings, the lower wall 58 of the feeder duct 54 is provided with a central opening 88 which is fitted with closure means in the form of a pair of doors 90 and 92 of differing lengths. The direction of flow of crop material through the feeder duct 54 is shown by the arrow in the feeder duct and with respect to this direction, the door 92 will be referred to as the trailing door and the door 90 as the leading door. The leading door 90 is provided with side flanges and is attached to a pivot shaft 94 to one end of which is secured an operating handle 96. The shaft 94 extends the full width of the leading door 90 and is rigidly attached to the door so that on operation of the handle 96, the door can be pivoted about the axis of the shaft 94. Likewise, the trailing door 92 is rigidly attached to a pivot shaft 98 which also extends the full width of the door and has rigidly attached to it an operating handle 100. The trailing door 92 also has side flanges and is provided at each side, towards the edge which cooperates with the adjacent edge of the leading door 90, with a latch pin 102. The edge of the trailing door 92 which cooperates with the adjacent edge of the leading door 90 is stepped as indicated at 104 in order to provide a recess to accommodate the edge of the leading door 90 so that when the doors are in the closed position, as shown in FIG. 2, of the drawings, the bodies of the doors lie in a single, albeit curved, plane. The step 104 is provided with a radiused edge so that should crop material contact the same, it will not provide any resistance to the flow of crop material thereover.

Common latch means 106 are provided for the two doors 90 and 92 and these latch means are provided at each side of the doors so as to ensure that the latter are maintained closed in a positive manner. Each latch 106 comprises a generally rectangular latch plate 108 which is pivotally mounted at 110 on the feeder duct and is provided with a slot 112 intermediate the ends of one of its longer edges. Each latch plate 108 is urged to the latching position by a spring 114 attached at one end to the latch plate and at the other end to the feeder duct 54. As seen in FIG. 2 of the drawings, each slot receives an associated latch pin 102 on the door 92 and thus retains that door in the closed position which in turn retains the door 90 in the closed position in view of the arrangement of the overlapping edges of the doors. Each latch plate 108 has pivotally attached to it at the end opposite the pivot 110 one end of a first link 116 forming part of a linkage mechanism. The other end of the link 116 is pivotally attached to an end of a second link 118, the distal end of which is rigidly attached to a shaft 120 which extends the full width of the doors 90, 92 in order to accommodate the two linkage mechanisms attached to the respective latches 106 at each side of the doors. A handle 122 is connected to the shaft 120 towards one end thereof and this extends generally upwardly so as to terminate in a region which is readily accessible by the operator of the machine when standing to one side thereof.

Figure 3:
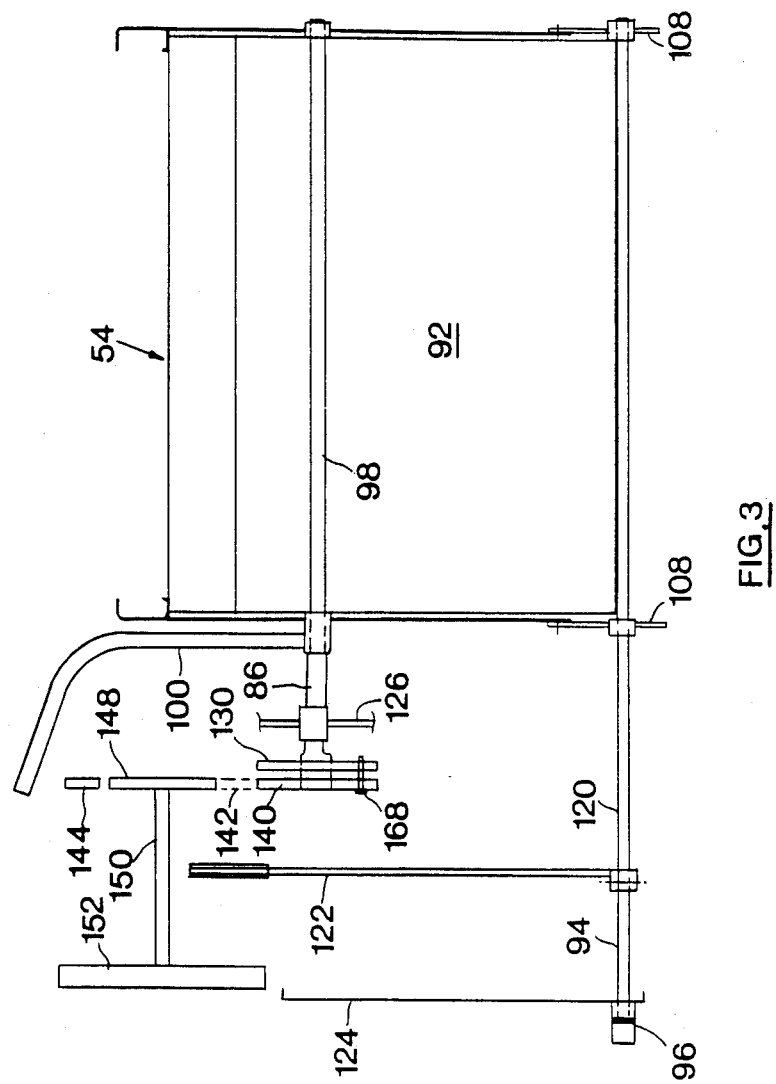
FIG. 3 is a diagrammatic view in the direction of arrow III of FIG. 2, with certain parts reintroduced from FIG. 1.

Turning now to FIG. 3 of the drawings, this illustrates the relative disposition of the handles 96, 100 and 122 and it will be seen that the handle 100 extends generally upwardly close to the side of the feeder duct 54 and is then cranked at its free end in order to extend towards the handle 96. The handle 122 is disposed between the associated side wall of the feeder duct 54 and a side sheet 124 of the machine. Finally, the handle 96 is located outside the side sheet 124.

A further side sheet 126 supports the feeder mechanism shaft 86 on which is freely rotatably mounted a sprocket 130 forming part of a drive train to be described. Keyed to the shaft 86 is a pulley 140 which receives a belt 142 which extends around that pulley, idler pulleys 144 and 146, and a pulley 148 attached to one end of a shaft 150 to the other end of which is attached a further pulley 152. A belt 154 extends around the pulley 152 to a further pulley 156 attached to a shaft 158 to which is connected a further pulley 160. The pick-up device 72 is driven from the pulley 160 via a belt 162 and a pulley 164, an idler pulley 166 being employed. It will be seen that the length of the shaft 150 is such that the pulley 152 is located immediately above and just inwardly of the side sheet 124. A shear bolt 168 is provided between the sprocket 130 and the pulley 140 in order that the former may drive the latter.

The sprocket 130, and hence the feeder mechanism 80, augers and pick-up 72, is driven from a drive train comprising a chain 170 extending around a sprocket 172 provided on a shaft 174 which also carries a sprocket 176. The sprocket 176 is driven by a chain 178 which wraps around that sprocket, an idler sprocket 180, a further idler sprocket 182, and a sprocket 184 attached to the output shaft 40 of the gearbox 36.

The normal operation of the baler shown in the drawings is the same as disclosed in U.S. Pat. No. 4,525,991 previously referred to. The doors 90 and 92 play no part in this normal operation and are only used when plugging of the feeder duct 54 occurs. When this happens, the shear bolt 168 will break, whereby the drive to the feeder mechanism 80 is interrupted, together with the drive to the augers and the pick-up 72. The drive train from the gear box 36 is not interrupted but with the breaking of the shear bolt 168, the sprocket 130 merely freely rotates on the shaft 86. With this drive arrangement, it is not possible to agitate the drive mechanism with a view to loosening the plug of crop material unless the shear bolt is first replaced but this in itself is not a straightforward operation in as much as it is not easy to align the holes in the sprocket 130 and the pulley 140. In any event, it is likely that even if the drive to the feed mechanism 80 could be reinstated, then the actuation thereof in either the normal forward direction or the opposite direction would probably not achieve loosening of the plug of crop material because the latter is normally so tightly wedged therein that the feeder mechanism cannot be moved. Accordingly, in order to remove the plug of crop material, the doors 90 and 92 are opened by operating the lever 122 which, through the respective linkage mechanisms 116 and 118, disengage the latch plates 108 from the latch pins 102 on the door 92. As previously mentioned, the movement of the latch plates 108 from the latched position to the unlatched position is generally at right angles to the force acting on the doors 90 and 92, which force acts generally radially of the feeder duct with respect to the rotational axis of the feeder mechanism 80. Accordingly, a comparatively small force is required to unlatch the doors 90, 92 and when the latch pins 102 are disengaged by the latch plates 108, the doors 90 and 92 automatically fall open under gravity and assume a generally vertical orientation as can be seen in chain lines in FIG. 2.

It may sometimes happen that once the doors 90 and 92 are opened, the plug of crop material will fall through the opening in the bottom wall 58 of the feeder duct 54 but if not, it is now possible to oscillate or rock the drive train to the feeder mechanism 80 now that the pressure in the feeder duct has been released. This oscillation of the feeder mechanism drive train is normally such as to dislodge the wad of crop material which is thus discharged to the ground through the opening in the lower wall 58 of the feeder duct 54. Actual oscillation of the drive train is preferably effected by acting upon the pulley 152 and a special tool may be provided to assist in this operation. The pulley may be provided with three equiangularly displaced spokes which thus provide openings which will accommodate the entry of members attached to the end of a lever and engagable with the spokes of the pulley in a manner such that the lever can be rotated in opposite directions so as to oscillate the drive train to the feeder mechanism 80 and thus free the plug of crop material.

Once the plug of crop material has been discharged to the ground, the doors 90 and 92 may not be closable because of the obstruction caused by the discharged plug and if this is so, then the machine can be moved forwardly or rearwardly over the discharged plug so that the latter can be removed or loosened and distributed over the ground for picking up by the pick-up mechanism 72 in a further pass of the baler. Due to the use of two doors to close the opening 88 in the lower wall 58 of the feeder duct 54, the length of each door 90, 92 is that much smaller than if a single door were provided and this means that the necessary ground clearance is obtained in order that the plug of crop material can pass under the open doors when the machine is moved from over that plug. As mentioned, the doors 90, 92 hang generally vertically, the axle of the ground wheels 16 limiting the opening movement of the longer trailing door 92, but the shorter trailing door 90 is able to swing substantially through 180°. The ground clearance of the leading door 90 is less than the trailing door 92 so that should it foul the top of the plug of crop material when the baler is moved with respect thereto, then it is able to swing in the appropriate direction in order not to hinder the movement of the baler or to damage the door.

Once the baler is ready for continued operation, the doors 90 and 92 are closed by the operator who first rotates the handle 96 attached to the door 90, whereby that door is swung to the closed position. The operator holds the door 90 in the closed position and then rotates the handle 100 which he is readily able to do even though he is retaining his hold on the handle 96. As the door 92 is rotated towards the closed position, the latch pins 102 will engage the edges of the respective latch plates 108 in which the slots 112 are provided, these edges providing lead-ins for the latch pins and continued rotation of the door 92 to the closed position will pivot the latch plates away from the latched position against the action of the springs 114 until such time as the latch pins are aligned with the slots 112. When this alignment occurs, the springs 114 will snap the latch plates back to the latched position and thus securely engage the latch pins 102 in the slots 112 and thus secure in a very positive manner the doors 90 and 92 in the closed position. Normal baling operation can now be resumed and the time taken to unplug a plugged machine is of the order of minutes compared with up to several hours which is necessary with machines not fitted with the present invention., Accordingly, the invention provides a significant advance in the art and yet is basically simple in construction and operation.

It will be seen from FIG. 2 of the drawings that the lower portion of the bottom wall 58 of the feeder duct 54 is arranged so that the rearward edge thereof is raised slightly above the hinged or pivoted edge of the leading door 90 to ensure the smooth flow of crop material over the junction and avoid snagging or wrapping of material around the pivot shaft 94. For the same reason, the upper end of the feeder duct bottom wall 58 has its forward or lower edge positioned slightly below the adjacent surface of the door 92.

It will be appreciated that the doors 90, 92 offer an advantage in addition to that of assisting in the removal of a plug of crop material, namely that of affording some measure of access to the feeder duct 54 and bale case 12 perhaps, for example, to inspect the cooperating knives on the plunger 20 and the bale case. It will also be appreciated that the latch means 106 may be operated other than manually, for example mechanically or electro-mechanically. Also, the doors 90, 92 could be opened and closed using pneumatic or hydraulic rams. As regards the illustrated embodiment, it would be possible to arrange for the doors 90, 92 to be closed by a single handle in place of the handles 96, 100.

What is claimed is:

1. In an agricultural baler including a bale case having an inlet opening formed in a bottom wall thereof, a feeder duct communicating at one end with the inlet opening in the bale case, a pickup disposed adjacent the other end of the feeder duct, and feeder means operable to feed crop material into the feeder duct to form a wad of crop material for subsequent transfer to the bale case; wherein an improvement comprises the feeder duct being provided with a lower wall which is curved upwardly and rearwardly from the pickup to the bale case, door means disposed in a curved portion of the feeder duct lower wall for movement between an open position and a closed position, and releasable latch means for latching the door means in said closed position.

2. In a baler according to claim 1, wherein said door means is hingedly attached to the feeder duct adjacent one end of an opening formed in the lower wall of the feeder duct.

3. In a baler according to claim 1, wherein said door means comprises a pair of doors hingedly attached to the feeder duct adjacent opposite ends of an opening formed in the lower wall of the feeder duct.

4. In a baler according to claim 3, wherein the pair of doors comprises a leading door and a trailing door having edges which overlap when said door means is in said closed position.

5. In a baler according to claim 4, wherein the leading door is positioned closer to said pickup than the trailing door.

6. In a bale according to claim 4, wherein the leading door and the trailing door are curved.

* * * * *